United States Patent

[11] 3,566,797

| [72] | Inventor | Francois Louis Giraud<br>Plaisir, France |
|---|---|---|
| [21] | Appl. No. | 768,286 |
| [22] | Filed | Oct. 17, 1968 |
| [45] | Patented | Mar. 2, 1971 |
| [73] | Assignee | Societe De L'"Aerotrain"<br>Paris, France |
| [32] | Priority | Oct. 19, 1967 |
| [33] | | France |
| [31] | | 125.114 |

[54] JET THRUST PROPULSION OR BRAKING DEVICE FOR A GROUND EFFECT MACHINE
7 Claims, 5 Drawing Figs.

[52] U.S. Cl. ............................................ 104/23,
104/120, 180/120
[51] Int. Cl. ............................................ B60v 1/04,
B60v 1/14, B60v 1/18
[50] Field of Search ............................................ 104/23
(FS), 120, 134; 180/116—121, 127

[56] References Cited
UNITED STATES PATENTS

| 3,135,480 | 6/1964 | Chaplin, Jr. ................ | 180/116 |
| 3,150,731 | 9/1964 | Franklin et al. ............ | 180/120 |
| 3,233,692 | 2/1966 | Guienne ..................... | 180/121 |
| 3,267,898 | 8/1966 | Evans ........................ | 180/120 |
| 3,467,213 | 9/1969 | Walker ...................... | 180/120 |

FOREIGN PATENTS

| 966,602 | 3/1950 | France ...................... | 104/23(FS) |

Primary Examiner—Joseph R. Leclair
Assistant Examiner—James R. Garrett
Attorney—Stevens, Davis, Miller & Mosher

ABSTRACT: A propulsion or braking device for a fluid cushion machine comprising means for supplying pressurized fluid to the cushion and exhausting fluid therefrom with a velocity component directed along the longitudinal axis of the machine.

Patented March 2, 1971
3,566,797
2 Sheets-Sheet 1
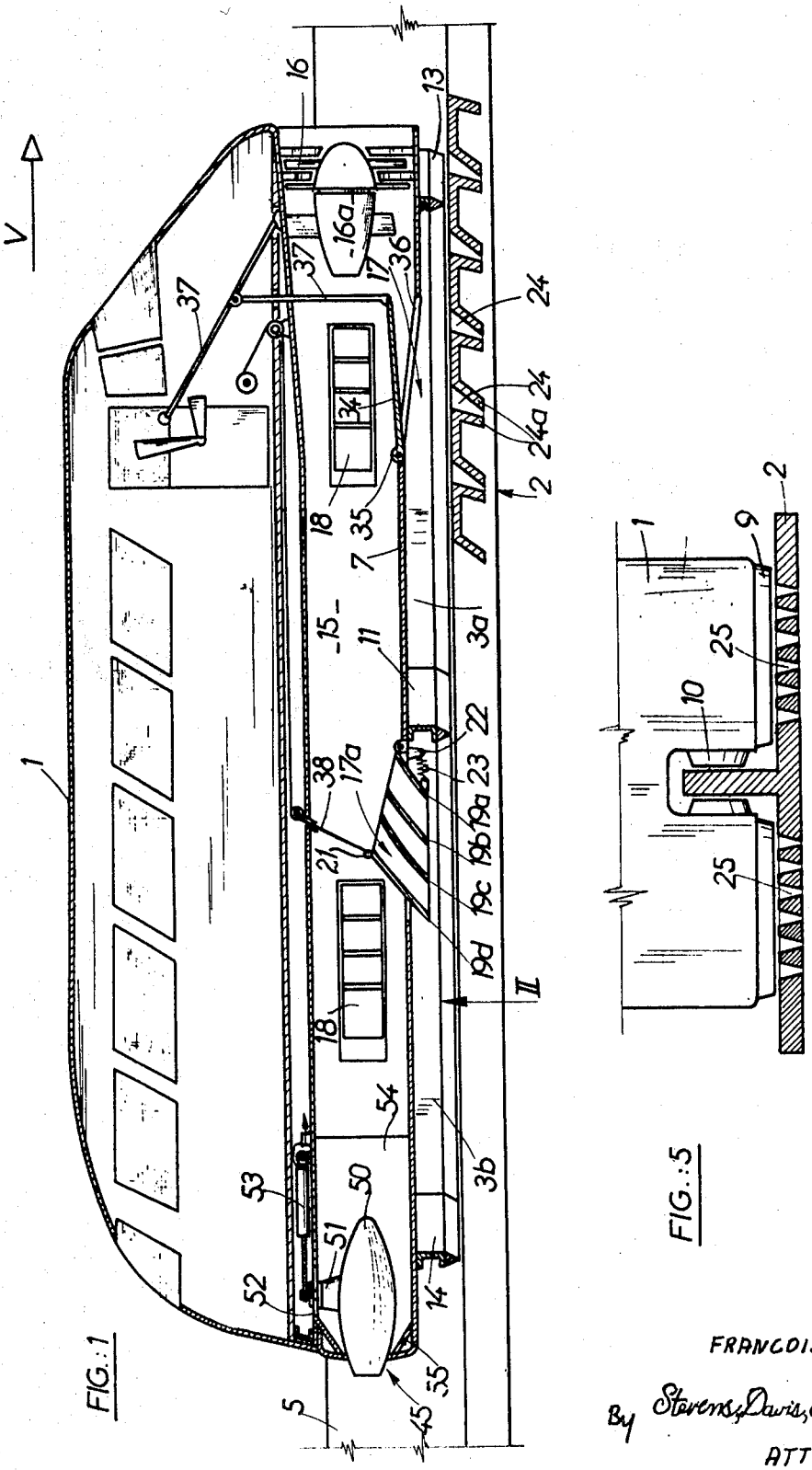
INVENTOR
FRANCOIS L. GIRAUD
By Stevens, Davis, Miller & Mosher
ATTORNEYS

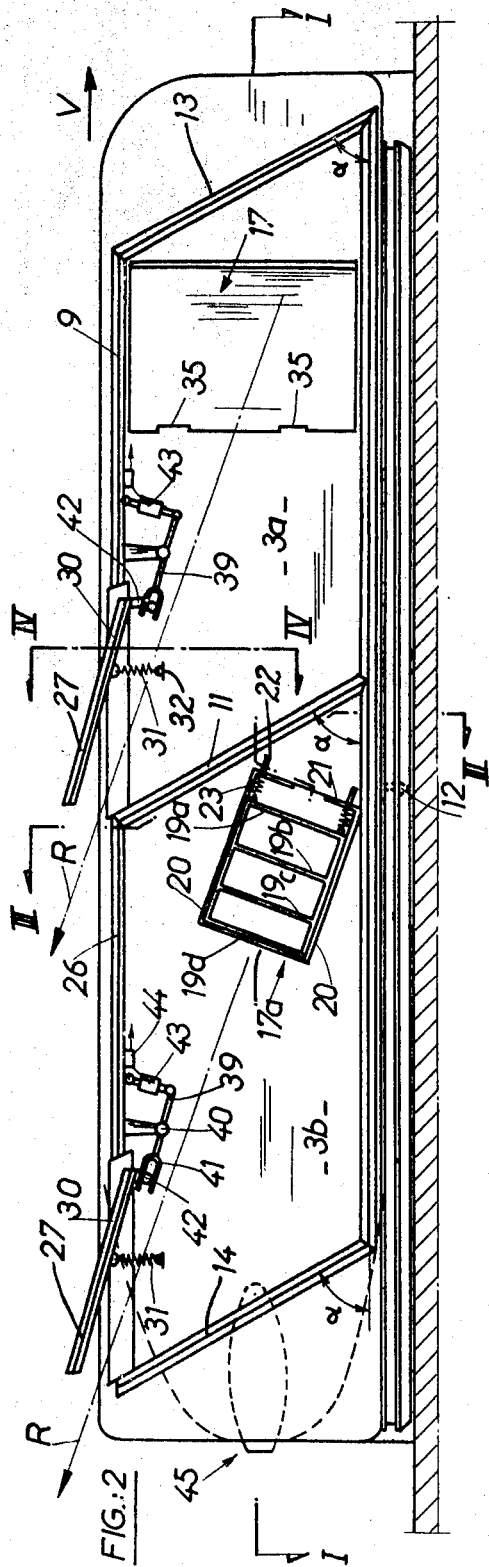
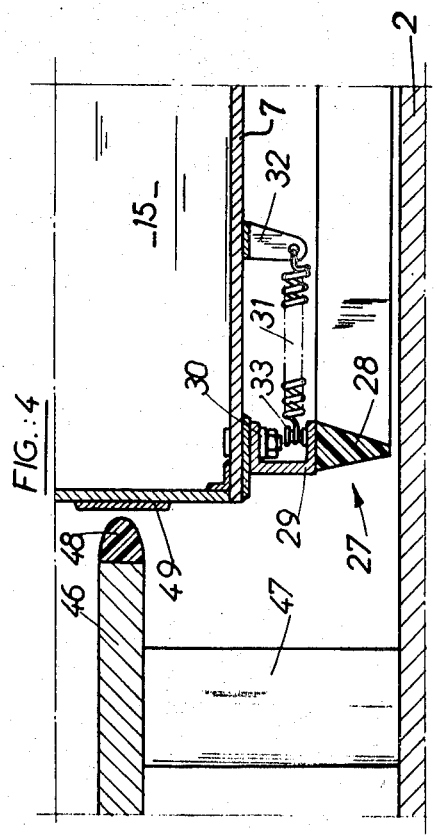
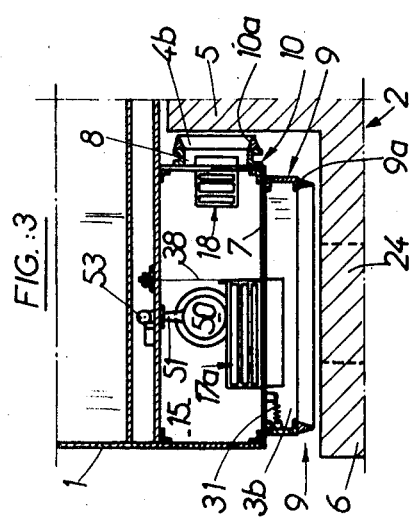

JET THRUST PROPULSION OR BRAKING DEVICE FOR A GROUND EFFECT MACHINE

This invention relates to a jet thrust propulsion or braking device for a ground-effect machine.

As those skilled in the art will be well aware, these machines are supported by the ground and, if required, likewise by a guide surface, through the medium of at least one fluid cushion, such cushion being a space peripherally delimited by a confining or skirt arrangement enclosing a fairly large area between the ground or the guide surface and the machine itself. The confining or skirt arrangement may be constituted by solid walls and/or curtains of fluid, peripherally bounding the fluid mass introduced under pressure into the said space.

The invention makes it possible to use the same fluid simultaneously to obtain the ground-effect supporting function, in particular the lift, and at least part of the force required to propel or brake the machine (consequently obtaining maximum performance from a simple compact equipment), to control the supporting forces, in particular the lift forces, acting at various points of the machine in order to provide it with automatic or controllable stability characteristics, and to reduce the noise of the power plant.

The invention provides in particular for the distribution of the surfaces required for the propulsion or braking function amongst ejection nozzles of large peripheral extent, this reducing the cabin noise and the external noise, whilst at the same time, by use of a simple structure, providing facility for the relative control of the lift, for example, and of the propulsion and trim of the machine.

In accordance with the invention, in one aspect means are provided for supplying the fluid under pressure for said cushion and for exhausting said fluid from the cushion, said means being designed to give the fluid, at entry into and exit from the cushion, a velocity component directed along the axis of the machine, thus producing an axial thrust on the machine. In another aspect, means are provided at at least two zones of the surface of the machine, opposite one and the same supporting surface (e.g. the ground, or a guide surface), in order to vary the velocity and/or static pressure of the fluid in these zones.

In accordance with one embodiment, the means for supplying each cushion comprises a pickup device for tapping fluid from a common manifold duct through which a pressurized fluid flows, and which acts to discharge the same into the interior of the cushion with a velocity component which is directed along the longitudinal axis of the machine. This latter result is obtained by arranging the pickup device with an appropriate inclination in relation to the normal direction of displacement of the machine. Preferably means will be provided in order to vary the flow discharged by the pickup device, thus controlling simultaneously the thrust and the internal superatmospheric pressure in each cushion. This latter means will preferably be controllable manually.

The manifold duct, supplied by a fluid pressure generator, is advantageously disposed in the longitudinal direction of the machine. It can be terminated towards the rear by a variable section nozzle opening to the atmosphere, possibly fitted with a silencer, thus making it possible directly to use, for a part of the propulsion function, the fluid flow coming from the generator and which is in excess of that required to supply the cushions.

As far as the means for exhausting the fluid from the cushion is concerned, this may generally comprise at least one rearwardly (or forwardly) opening passage in the sidewall (rigid or flexible) which is comprised in the lateral skirt arrangement for the fluid cushion, as well as means for controlling said passage so as to create a discharge orifice of appropriate kind at said discontinuity.

Across this passage there exhausts a proportion of cushion fluid, with a velocity component directed along the longitudinal axis of the machine. The passage may be controlled either manually or automatically, as a function of the condition of the cushion, and the exhausting flow is responsible, in part at least for the propulsive or braking thrust of the machine.

Said exhaust passage can be created by the relative displacement of part of the wall of the cushion skirt. This wall element can cooperate with an oblique deflecting baffle means in order to promote lateral ejection of cushion fluid with a component directed along the longitudinal axis of the machine. The deflecting baffle means may be constituted by an element which is common to the skirt arrangements of two contiguous cushions arranged longitudinally one behind the other.

The invention will be understood from a consideration of the conditions of dynamic and static pressure prevailing in the fluid cushions.

In a normal fluid cushion, the velocity is negligible and there is a superatmospheric pressure, called the static pressure, which produces the lift effect on the machine.

In the device in accordance with the invention, the same static superatmospheric pressure prevails, with the same effect, but there is added to it a considerable velocity in direction having a component directed along the longitudinal axis of the machine, this corresponding to a dynamic pressure and being responsible for the production of a propulsive or braking thrust.

The description which now follows with reference to the accompanying drawings will indicate by way of example how the invention may be put into effect.

In the drawings:

FIG. 1 is a longitudinal section on the line I–I of FIG. 2, through a ground-effect machine in accordance with the invention;

FIG. 2 is a partial bottom plan view of the machine, seen in the direction of the arrow II of FIG. 1 and showing a skirt arrangement with mobile elements in the opened position;

FIG. 3 is a partial transverse section on the line III–III of FIG. 2;

FIG. 4 is a sectional view of a detail of FIG. 2 on the line IV–IV of FIG. 2;

FIG. 5 is a sectional view of a variant embodiment of a track.

In FIGS. 1 to 4, which relate to one embodiment of the invention, the reference 1 designates the structure of a ground-effect machine supported and guided on a track 2 through the medium of fluid cushions 3a, 3b and 4a, 4b. In the example selected, the track has the form of an inverted T with a central rib 5 and two substantially horizontal load-bearing zones 6. The cushions 3a, 3b cooperate in known manner with the load-bearing zones of the track to provide support or lift for the machine, whilst the cushions 4a, 4b cooperating with the central rib of the track are guide cushions. The direction of displacement of the machine is indicated by the arrow V.

The spaces bounding the respective cushions 3a, 3b, 4a, 4b are bell-shaped and their respective bases 7,8 in this case form part of the structure of the machine, whilst their lateral walls, generally marked by 9 and 10, are advantageously constituted, at least in those zones closest to the track, by flexible skirt elements. Baffle walls 11, 12, respectively fixed to the bases 7,8 and directed transversly in relation to the track, form partition walls separating from one another the cushions 3a and 3b, or 4a and 4b.

It can be seen, in particular in FIG. 2, that on the walls 11 and the walls 13 and 14 delimiting the respective lift cushions at front and rear of the machine are, considered in a horizontal plane, located obliquely to the axis of the machine making an angle therewith of less than 90°.

The assembly of lift and guidance cushions situated at one and the same side of the median longitudinal plane of the machine is supplied with pressurized fluid through a common manifold duct 15 supplied by a compressor 16 driven by a motor 16a.

To this end, each of the fluid cushions is individually connected to the said duct by a pickup device.

The manifold duct 15 may have a cross section reducing in the direction from front to rear, in order to impart to the fluid passing through it a predetermined velocity and therefore a constant dynamic pressure. In this case, the pickup device is arranged to exploit this reduction in section by disturbing the fluid flow as little as possible.

Alternatively the manifold duct may have a constant cross section in the case where a substantial proportion of the air is ejected directly at the rear of the machine through the extremity of said duct, in order to provide direct propulsion. In this case, the dynamic pressure will reduce only very little towards the rear of the machine.

The FIGS. 1 to 4 actually illustrate a combination of two of the possibilities hereinbefore described.

In particular, pickup devices 17, associated with the lift cushions 3a, are arranged as explained hereinbefore in order to exploit the reduction in section of the manifold duct 15. These pickup devices are each in the form of a plate 34, articulated at 35, which closes off an opening 36 formed in the wall of the duct 15 to a greater or lesser extent. Control rods 37 are provided in order to allow the pickup device to be operated from the driver's position.

Another type of pickup device, associated with the cushions 4a—4b and referenced 18, as well as one referenced 17a and associated with the cushion 3b, comprises a certain number of deflectors (four in the example illustrated) 19a, 19b, 19c, 19d, assembled between two parallel sideplates 20 and projecting into the interior of the manifold duct 15. It will be noted that the length of the deflectors, and consequently their penetration into the duct, increases, from the deflector 19a towards the deflector 19d.

The assembly formed by the deflectors 19a, 19b, 19c, 19d and the sideplates 20 is articulated about pivot pins 21 carried by the duct 15. The reference 23 indicates springs which are fixed on the one hand to a fixed bracket 22 and on the other to the deflector assembly.

A cable 38 enables each pickup device to be operated from the driver's position.

The horizontal or quasi-horizontal load-bearing zones 6 of the track are porous and in this context contain a succession of transverse slots 24, separated from one another by profiled deflector surfaces 24a, said slots constituting a series of nozzlelike passages through which part of the pressurized fluid can escape from the cushions to the atmosphere. The slots will advantageously be directed parallel to the velocity component of the fluid issuing from the pickup devices in the cushions, in order to disturb the flow in the said devices as little as possible. In accordance with one variant embodiment shown in FIG. 5, the transverse slots 24 are replaced by longitudinal slots 25. This arrangement has the same advantages as the one described hereinbefore, and avoids the need for selecting the inclination of the slots.

At least one of the lateral or sidewalls 9, preferably external, delimiting the cushions in the longitudinal sense, contains a succession of fixed sections 26 and movable section 27.

The movable sidewall section 27 (see FIG. 4) comprises a lip 28 fixed to an angle element 29 mounted to move about a pivot pin 30. A spring 31, fixed on the one hand to the base 7 by means of a bracket 32, and on the other hand to the angle element 29 through the medium of a peg 33, biases the movable sidewall section 27 into the closed position in which the continuity of the wall 9 is maintained.

In operation, the movable sidewall sections 27 initially occupy their closed position and then, once a certain degree of superatmospheric pressure has been developed in the cushion, these section pivot about the pins 30, into the position shown in FIG. 2, thus creating a nozzlelike discontinuity or passage in the wall 9.

The control of these movable sidewall sections is effected through the medium of a lever 39 pivoted at 40. The yoke end 41 of this lever cooperates with a dog 42 carried by each movable sidewall section, whilst the other end of the lever is connected to a jack 43, of the electromechanical type in the example shown. These jacks are operated from the driver's position, by elements which are now shown, but which terminate in junction boxes 44.

The fluid of the cushion can thus escape in the direction of the arrow R, the guiding of this escaping flow being facilitated by the oblique walls 11 and/or 14 acting as deflecting baffles.

The fluid not tapped off by the pickup devices 17 and 18 can serve a propulsion function. To this end, the rear part of the duct 15 is equipped with a device incorporating a variable exit-section nozzle 45. For this purpose, a restrictor 50 which controls the exit section of the nozzle 45 is carried on at least one faired arm 51 which slides in a slot 52 and can be operated by a jack 53 controlled from the driver's cabin by means which are not illustrated.

Walls 54 and 55 may advantageously be used to reduce the cross-sectional area of the nozzle without modifying the external shape of the duct 15. This nozzle may include a silencer arrangement, although this has not been shown in the illustration.

One manner in which the various elements above-described may be used, for example, is as follows:

When it is required that the machine should operate silently, propulsion or braking will be effected using the elements which enable the fluid ejected into the atmosphere to be broken up into a large number of jets.

For this purpose, the propulsion (or braking) of the machine can be produced by ejecting fluid through the porous track, the pickup devices 17 and 17a, at least, being so adjusted as to supply a large flow rate into the cushions 3a and 3b. Equally, the movable sidewall sections 27 of the walls 9 can be placed in a position similar to that shown in FIG. 2, part of the fluid deflected by the pickup devices escaping in the direction of the arrow R.

In addition, a panel 46 fixed to the track 2 by faired arms 47 and having a flexible bead 48, cooperates with a strip 49 carried by the machine. The purpose of this panel is to channel the fluid ejected in the direction of the arrow R, when the mobile elements 27 are in the position shown in FIG. 2.

The said panel can at the same time be used as a platform by which access is gained to the machine.

A machine of this kind may also move along a nonporous track. In this case, the ejection of the fluid will take place through rear exits 45, the pickup devices 17 and 17a being located in a position such that they substantially only tap off the quantity of fluid necessary to lift the machine.

The fluid can simultaneously escape through the rear exit 45 and the nozzlelike discontinuities of the sidewall 9, in the direction of the arrows R, and possibly also via the porous track, particularly where the machine is travelling at high speed. It will also be appreciated that the flow of fluid circulating in the mainfold ducts 15 can be increased by the ram effect due to the forward speed.

One of the important features of the invention is the facility it provides, by enabling substantial rates of leakage to be developed in at least the lift cushions of a machine, for controlling the stability of said machine, this using a motor/compressor set which is common to the functions of propulsion and braking and the supply of the various cushions.

In other words, if, for example, it is only the forward part of the machine which is loaded, then in order to restore the machine to the proper hover height, the pressure inside the forward cushion 3a must be raised.

To do this, the leakage cross section of these enclosures can be reduced by returning the movable sidewall sections 27 towards their initial positions, to ensure the continuity of the sidewall 9. The propulsion in then created by discharge of fluid at the rear and/or by escape of fluid in the direction of the arrows R from the rear cushions 3b and/or across the porous track.

It is also possible to vary the positions of the pickup devices associated with the cushions whose pressure is to be increased, by placing said devices in a position in which they tap off a higher flow rate. Assuming that the leakage cross section is substantially constant, a higher flow rate of supply will correspond to an increase in the pressure inside the enclosure 3a, reestablishing the machine at the normal hover height.

The reduction in the leakage cross section of the cushions, and an increase in the supply flow rate, can be effected substantially conjointly.

It will be apparent that the embodiment described is only an example and is open to modification in various ways within the scope of the invention, as defined by the appended claims.

I claim:

1. A ground effect machine movable along a bearing surface with the interposition of at least two pressure fluid cushions, said machine comprising:

a frame including a top surface facing said bearing surface;

confining wall means projecting from said frame toward said bearing surface and delimiting in cooperation with said top surface the said pressure fluid cushions; said wall means comprising sidewalls extending substantially longitudinally of the machine;

a pressurized fluid generator;

a manifold duct extending substantially longitudinally of the machine and connected to said generator, and wherein a stream of said pressurized fluid flows;

pickup devices for tapping fluid from said stream and discharging the same through said top surface into the interior of the respective cushions with a velocity component parallel to the longitudinal axis of the machine, and means for controlling said pickup devices, whereby the fluid flow rate therethrough may be varied;

at least one passage opening formed through a sidewall of each of the fluid cushions for exhausting a flow of cushion fluid to the ambient atmosphere;

guiding means adapted to impart to said flow a direction in alignment with the discharge flow from said pickup devices in a plane substantially perpendicular to said bearing surface; and adjustable obturating means for said passage opening.

2. A machine as claimed in claim 1, further comprising a propulsion nozzle directed toward the rear of the machine and fitted at the rear end of the mainfold duct.

3. A ground effect machine according to claim 1, wherein said guiding and obturating means comprise a sidewall section embodied in said sidewall and displaceable relatively to the rest of the said sidewall.

4. A machine according to claim 3, wherein said guiding means further comprise a baffle wall projecting from the machine frame toward the bearing surface and extending in a direction having a component normal to the longitudinal axis of the machine, said baffle wall and said displaceable sidewall section forming together two opposite walls of a nozzlelike cushion fluid escape passage the mean direction of which has a component parallel to the longitudinal axis of the machine.

5. A machine according to claim 4, wherein said baffle wall forms a partition wall separating from one another said cushions.

6. A machine as claimed in claim 1, wherein at least one of the pickup devices comprises at least one wall inclined to the longitudinal axis of the machine and projecting into the manifold duct to scoop fluid therefrom.

7. The machine as claimed in claim 6, wherein the means for controlling said pickup device comprise means for controlling the inclination of said inclined wall.